United States Patent
Knowles

(10) Patent No.: US 9,936,444 B2
(45) Date of Patent: Apr. 3, 2018

(54) EXCHANGING CONFIGURATION INFORMATION WIRELESSLY

(71) Applicant: Imagination Technologies Limited, Kings Langley (GB)

(72) Inventor: Ian Knowles, Buckinghamshire (GB)

(73) Assignee: Imagination Technologies Limited, Kings Langley (GB)

( * ) Notice: Subject to any disclaimer, the term of this patent is extended or adjusted under 35 U.S.C. 154(b) by 201 days.

(21) Appl. No.: 14/667,078

(22) Filed: Mar. 24, 2015

(65) Prior Publication Data

US 2015/0271745 A1    Sep. 24, 2015

(30) Foreign Application Priority Data

Mar. 24, 2014  (GB) .................................. 1405194.0
Sep. 12, 2014  (GB) .................................. 1416168.1

(51) Int. Cl.
| | |
|---|---|
| *H04W 4/00* | (2009.01) |
| *H04W 48/16* | (2009.01) |
| *H04W 8/24* | (2009.01) |
| *H04L 12/24* | (2006.01) |
| *H04W 48/08* | (2009.01) |
| *H04W 8/00* | (2009.01) |
| *H04W 48/12* | (2009.01) |
| *H04W 84/20* | (2009.01) |

(52) U.S. Cl.
CPC ............ *H04W 48/16* (2013.01); *H04L 41/12* (2013.01); *H04W 8/24* (2013.01); *H04W 48/08* (2013.01); *H04W 8/005* (2013.01); *H04W 48/12* (2013.01); *H04W 84/20* (2013.01); *Y02B 60/50* (2013.01)

(58) Field of Classification Search
CPC .............................. H04W 48/08; H04W 48/16
USPC .......................................................... 370/252
See application file for complete search history.

(56) References Cited

U.S. PATENT DOCUMENTS

2005/0048924 A1*  3/2005  Nelson ................ H04L 41/0206
                                                     455/67.11
2007/0099635 A1*  5/2007  Mohanty ............... H04W 68/00
                                                     455/458

(Continued)

OTHER PUBLICATIONS

Habault et al., "Lightweight Service Announcement: The Case for Wi-Fi M2M Service Providers," IEEE International Conference on ANTS, pp. 1-6, Dec. 2013.

*Primary Examiner* — Farah Faroul
(74) *Attorney, Agent, or Firm* — Vorys, Sater, Seymour and Pease LLP; Vincent M DeLuca

(57) ABSTRACT

Methods and systems for wireless stations to wirelessly exchange configuration information using the vendor specific field of management frames (e.g. Wi-Fi™ probe request frames, Wi-Fi™ beacon frames or Wi-Fi probe response frames). Each wireless station can then use the configuration information to configure itself for a particular application or task. For example, the wireless stations may use the configuration information to determine the appropriate topology of a collection of wireless stations for the application or task. Using the management frames to exchange configuration information allows the wireless stations to exchange configuration information without being fully connected to a wireless network. This then allows the wireless stations to exchange configuration information while they are operating in a low-power mode (e.g. in a mode where the network stack is disabled).

20 Claims, 10 Drawing Sheets

(56) References Cited

U.S. PATENT DOCUMENTS

| | | | |
|---|---|---|---|
| 2008/0020801 A1* | 1/2008 | Fesas | H04W 28/18 |
| | | | 455/561 |
| 2008/0081560 A1 | 4/2008 | Jougit | |
| 2011/0110349 A1 | 5/2011 | Grandhi | |
| 2013/0023267 A1 | 1/2013 | Ong et al. | |
| 2013/0204965 A1* | 8/2013 | Masputra | H04L 47/60 |
| | | | 709/217 |
| 2014/0126550 A1* | 5/2014 | Frederiks | H04W 72/10 |
| | | | 370/336 |
| 2014/0241226 A1* | 8/2014 | Jia | H04W 48/14 |
| | | | 370/311 |
| 2015/0003284 A1* | 1/2015 | Gupta | H04W 4/08 |
| | | | 370/254 |
| 2015/0052255 A1* | 2/2015 | Sun | H04L 49/253 |
| | | | 709/227 |
| 2015/0092639 A1* | 4/2015 | Jia | H04W 52/02 |
| | | | 370/311 |

* cited by examiner

EXCHANGING CONFIGURATION INFORMATION WIRELESSLY

BACKGROUND

In a wireless network that comprises multiple wireless stations there may be need for the wireless stations to exchange information about their capabilities, configuration etc. For example, the wireless stations may be arranged into groups to perform certain tasks or actions. Often there is a requirement that one of the wireless stations in the group act as a master to the other wireless stations in the group. However, to select an appropriate master the wireless stations need to exchange information about their capabilities etc.

For a wireless station to send data within a wireless network, the wireless station must be fully connected to the wireless network. In some wireless protocols, such as Wi-Fi™, to be fully connected to the wireless network, the wireless station must obtain and maintain a unique address, namely an IP address. This requires the station's network stack (e.g. TCP/IP stack) to be enabled or powered on. This inherently consumes more power than if the network stack is turned off or is in another lower power mode.

Accordingly, in traditional wireless networks, when a wireless station is idle for a period of time it may remain fully connected to the wireless network (which wastes power) to keep track of the other wireless stations in the network and their capabilities. Alternatively the wireless station may enter a low power mode (e.g. the network stack is disabled) where it is unable to keep track of the other wireless stations in the network and their capabilities and/or configuration information. This may cause a delay when the wireless station is subsequently asked to perform a task or action that requires the capabilities and/or configuration information since the wireless station does not have an accurate picture of the other wireless stations and their capabilities and/or configuration.

The embodiments described below are not limited to implementations which solve any or all of the disadvantages of known wireless systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and systems for wireless stations to wirelessly exchange configuration information using the vendor specific field of management frames (e.g. Wi-Fi™ probe request frames, Wi-Fi™ beacon frames or Wi-Fi probe response frames). Each wireless station can then use the configuration information to configure itself for a particular application or task. For example, the wireless stations may use the configuration information to determine the appropriate topology of a collection of wireless stations for the application or task. Using the management frames to exchange configuration information allows the wireless stations to exchange configuration information without being fully connected to a wireless network. This then allows the wireless stations to exchange configuration information while they are operating in a low-power state (e.g. in a state where the network stack is disabled).

A first aspect provides a method of selecting a topology for a collection of wireless stations, the method comprising: wirelessly receiving at a wireless station one or more configuration management frames, each configuration management frame being a management frame comprising configuration information for another wireless station in a vendor-specific field; and applying predetermined criteria to the received configuration information at the wireless station to determine a topology for a collection of wireless stations, the collection of wireless stations comprising at least the wireless station and the other wireless station.

A second aspect provides a system to select a topology for a collection of wireless stations, the system comprising a wireless station comprising: a wireless module configured to wirelessly receive one or more configuration management frames, each configuration management frame being a management frame comprising configuration information for another wireless station in a vendor-specific field; and a processor in communication with the wireless module, the processor configured to apply predetermined criteria to the received configuration information to select a topology for a collection of wireless stations, the collection of wireless stations comprising at least the wireless station and the other wireless station.

A third aspect provides a non-transitory computer readable storage medium having stored thereon computer executable program code that when executed causes at least one processor to execute the method of the first aspect.

A fourth aspect provides a method of wirelessly exchanging configuration information, the method comprising: wirelessly receiving at a wireless station one or more configuration management frames for one or more other wireless stations, each configuration management frame being a management frame comprising configuration information for one of the one or more other wireless stations in a vendor-specific field; and applying predetermined criteria to the received configuration information at the wireless station to configure the wireless station for one of an application and a task, the configuration enabling the wireless station to execute the application or task without having to first request the configuration information from the one or more other wireless stations.

A fifth aspect provides a wireless station comprising: a wireless module configured to wirelessly receive one or more configuration management frames for one or more other wireless stations, each configuration management frame being a management frame comprising configuration information for one of the one or more other wireless stations in a vendor-specific field; and a processor in communication with the wireless module, the processor configured to apply predetermined criteria to the received configuration information to configure the wireless station for one of an application and a task, the configuration enabling the wireless station to execute the application or task without having to first request the configuration information from the one or more other wireless stations.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory)

storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
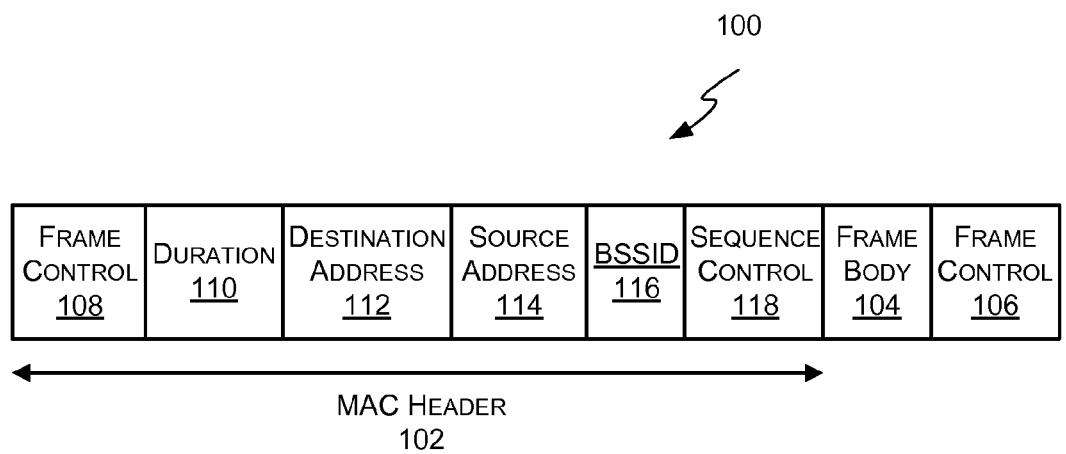
FIG. 1 is a schematic diagram of a Wi-Fi management frame.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The term "wireless network" is used herein to mean two or more wireless stations that use a common wireless protocol, such as, but not limited to, Wi-Fi™, Bluetooth™, or Near Field Communication (NFC) to communicate with each other. The term "wireless station" is used herein to mean an electronic device that has a wireless module that allows the wireless station to send and receive data using a wireless protocol. The term "wireless access point" is used herein to mean an electronic device that acts as a central transmitter and receiver of wireless stations. Some protocols, such as Wi-Fi™, require, in certain modes of operation, a wireless access point to facilitate communication between wireless devices.

For a wireless station to send and/or receive data to/from another wireless station, the wireless station must be fully connected to the wireless network. In some cases, this requires the wireless station to obtain and maintain a unique address, such as an IP address and open an IP channel. To keep the IP address and channel alive the wireless station's wireless module must be fully powered on and operational. This inherently consumes more power than if the wireless module is turned off or is in another lower power mode.

As described above, some applications or tasks require wireless stations to have a particular configuration (e.g. topology). The term "topology" is used herein to mean the arrangement and/or interconnection of a plurality of wireless stations. For example, some applications or tasks may require the wireless stations in a wireless network (or a subset or group of the wireless stations) to have a master wireless station which is responsible for performing special tasks. However, to determine or select the appropriate configuration (e.g. topology) the wireless stations need to exchange information about their capabilities etc.

Accordingly, when a wireless station is idle for a period of time it may remain validly connected to the wireless network (which wastes power) to keep track of the other wireless stations in the network and their capabilities. Alternatively it may enter a low power mode (e.g. the network stack (e.g. TCP/IP stack) is disabled) where it is unable to keep track of the other wireless stations in the network and their capabilities. This may cause a delay when the wireless station is subsequently asked to perform a task or action that requires a specific topology (e.g. it requires a master) since it does not have an accurate picture of the other wireless stations and their capabilities and thus it cannot determine the correct topology. Therefore, before the wireless station can perform the task it must communicate with the other wireless stations to obtain configuration information so it can determine the correct topology for performing the task.

Embodiments described herein relate to methods and systems that use the vendor-specific field of a wireless protocol management frame to exchange configuration information between wireless stations. Wireless protocols use special management frames to transmit information about a wireless network to allow wireless stations to join and/or communicate via the wireless network. Example management frames will be described with reference to FIGS. 1 to 4. Since management frames provide information that allows a station to join a network they can typically be transmitted and received before a wireless station is fully connected to the wireless network.

Accordingly, using the vendor-specific field of management frames to transmit configuration information allows wireless stations to exchange configuration information without being fully connected to the wireless network. As a result, wireless stations can transmit and receive configuration information while operating in a low-power mode (e.g. a mode where the network stack is disabled).

Since a wireless station will be able to maintain current configuration information for wireless stations in the wireless network, even when operating in a low-power mode, whenever the wireless station is called on by a particular application (e.g. to perform a particular task) the wireless station will have enough information to quickly and easily select the appropriate topology for the particular application and/or task. For example, the wireless stations will have enough information to quickly and easily select a master wireless station. Accordingly, a wireless station does not have to waste time first obtaining configuration information from the other wireless stations before being able to perform the task. This allows tasks to be executed much more quickly and efficiently.

To ensure that all wireless stations and access points in a wireless network can properly identify management frames they have a standard frame format. For example, IEEE 802.11 (i.e. Wi-Fi™) management frames have the standard frame format shown in FIG. 1. Specifically, each Wi-Fi™ management frame 100 comprises a MAC (Media Access Control) header portion 102, a frame body portion 104, and a frame control portion 106. The MAC header portion 102 comprises a frame control field 108, a duration field 110, a destination address field 112, a source address field 114, a Basic Service Set Identification (BSSID) field 116, and a sequence control field 118. As is known to those of skill in the art a single access point together with all associated stations is called a Basis Service Set (BSS). The access point acts as master to the stations within that BSS. Each BSS is identified by a BSSID. In an infrastructure BSS, the BSSID is the MAC address of the access point.

There are several types of Wi-Fi™ management frames that exist for providing different management functions. Example types of management frames include beacon frames, probe request frames and probe response frames. Beacon frames announce the existence of a network and are transmitted at regular intervals to allow Wi-Fi™ stations to find and identify a network. In an infrastructure Wi-Fi™ network, the access point is responsible for transmitting beacon frames. Probe request frames are used by Wi-Fi™ stations to actively scan an area for existing Wi-Fi™ networks (instead of, for example, waiting for a beacon). In an infrastructure network an access point that receives a probe request frame responds with a probe response frame that includes all the parameters of the network supported by the access point.

Each type of Wi-Fi™ management frame has the basic frame format shown in FIG. 1, but has a different format for the frame body portion 104.

Figure 2:
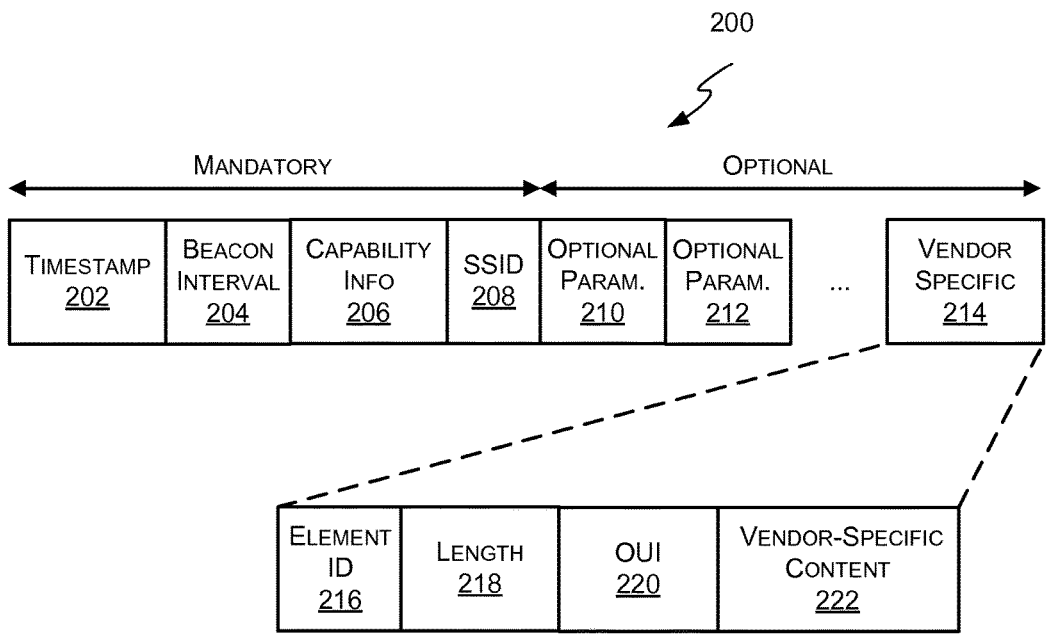
FIG. 2 is a schematic diagram of the frame body of a Wi-Fi beacon frame.

Reference is now made to FIG. 2 which illustrates the frame body portion 200 of a Wi-Fi™ beacon frame. According to the IEEE 802.11 standard, the frame body portion 200 of a beacon frame has the format shown in FIG. 2. Specifically, the frame body portion 200 of a beacon frame comprises one or more fields. According to the IEEE 802.11 standard, a probe request must comprise a timestamp field 202, a beacon interval field 204, a capability information field 206, and an SSID field 208.

The timestamp field 202 comprises the value of the timing synchronization function (TSF) time of the device that transmitted the beacon frame. In infrastructure mode, after receiving a beacon frame, a station changes their local clock to this time. This aids in synchronization.

The beacon interval field 204 comprises the time interval between beacon frame transmissions of the transmitting device expressed in time units (TUs).

The capability information field 206 comprises the information about the capability of the network and/or device. It may include information, such as, but not limited to, the mode of operation (ad hoc or infrastructure), support for polling, encryption etc.

The SSID field 208 specifies the SSID or SSIDs used by the transmitting device. As is known to those of skill in the art an SSID is a sequence of alphanumeric characters (letter or numbers) that uniquely defines a Wi-Fi™ network. All access points and stations attempting to connect to a specific Wi-Fi™ network use the same SSID.

The frame body 200 of a beacon frame may optionally also comprise one or more optional fields 210, 212, 214. Optional fields may comprise, but are not limited to, a supported rates field, a frequency-hopping (FH) parameter set field, a direct-sequence (DS) parameter set field, a contention-free (CF) parameter set field, an IBSS parameter set field, a traffic indication map (TIM) field, and a vendor specific field 214.

The vendor-specific field 214 may be used to carry information not defined in the IEEE 802.11 standards and has the format shown in FIG. 2. Specifically, it comprises an element ID sub-field 216, a length sub-field 218, an Organizational Unique Identifier (OUI) sub-field 220, and a vendor-specific content sub-field 222. The element ID sub-field 216 identifies the specific type of field (e.g. it identifies the field 214 as a vendor specific field). The element IDs are defined in the IEEE 802.11 standards. The length sub-field 218 specifies the length of the field. The OUI sub-field 220 includes a set of alphanumeric characters that uniquely identifies a vendor. The IEEE assigns OUIs to vendors. The OUI is sometimes referred to as the vendor ID. The vendor-specific content sub-field 222 may contain any content and is only limited by the maximum frame size.

The IEEE 802.11 standards specify the order in which the optional fields are to be placed in the frame body 200. In particular, the IEEE 802.11 standards specify that the vendor specific field 214 is to be the last field in the frame body 200 of a beacon frame.

Figure 3:
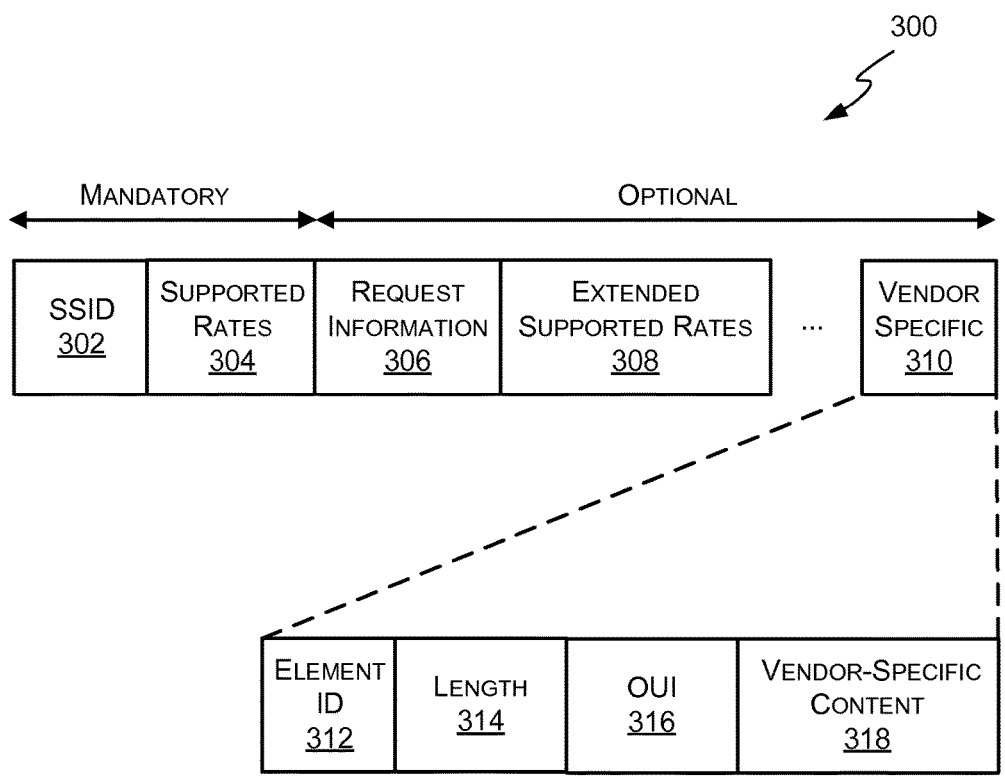
FIG. 3 is a schematic diagram of the frame body of a Wi-Fi probe request frame.

Reference is now made to FIG. 3 which illustrates the frame body portion 300 of a Wi-Fi™ probe request frame. According to the IEEE 802.11 standards, the frame body portion 300 of a Wi-Fi™ probe request frame has the format shown in FIG. 3. In particular, the frame body 300 of a probe request must comprise an SSID field 302 and a supported rates field 304.

The SSID field 302 is used to identify an SSID. When the probe request is a directed probe request the SSID field 302 comprises a specific SSID. Conversely, when the probe request is a broadcast probe request, the SSID field 302 comprises a null SSID.

The supported rates field 304 is used to specify the transmission rates supported by the station. Up to eight transmission rates may be specified.

The frame body 200 of a probe request frame may optionally also comprise one or more optional fields such as a request information field 306, an extended supported rates field 308 and a vendor specific field 310.

The vendor specific field 310 of the probe request frame, like the vendor specific field of the beacon frame, may be used to carry information not defined in the IEEE 802 standards and comprises an element ID sub-field 312, a length sub-field 314, an OUI sub-field 316 and a vendor-specific content sub-field 318.

Figure 4:
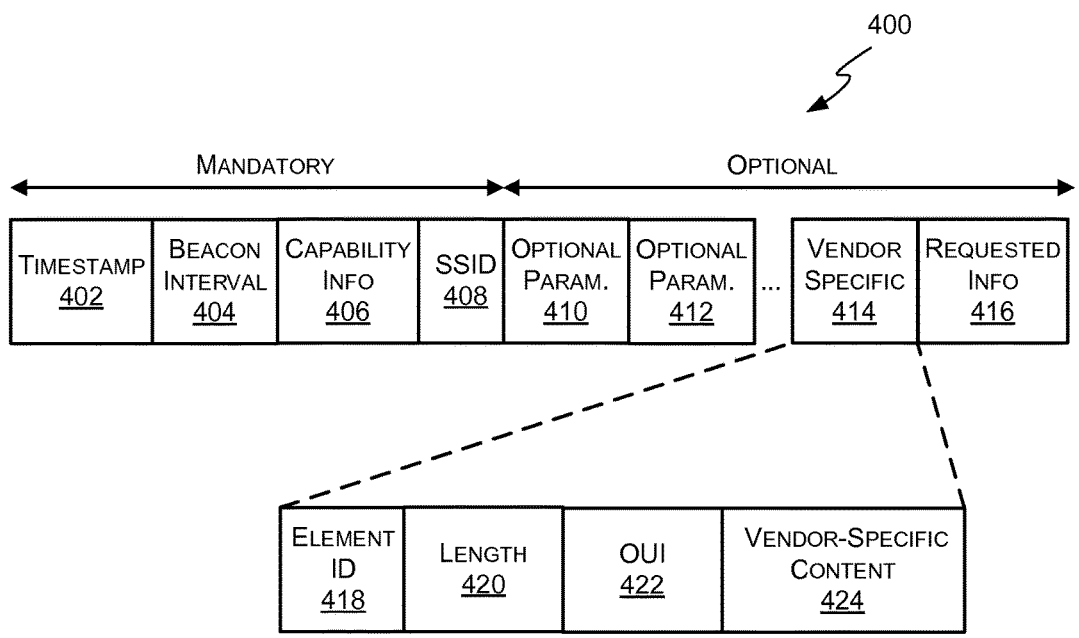
FIG. 4 is a schematic diagram of the frame body of a Wi-Fi probe response frame.

Reference is now made to FIG. 4 which illustrates the frame body portion 400 of a Wi-Fi™ probe response frame. The frame body portion 400 of the probe response frame is similar to the frame body portion 200 of a beacon frame. In particular, like the frame body portion 200 of a beacon frame, the frame body 400 of the probe response frame comprises a timestamp field 402, a beacon interval field 404, a capability information field 406, and an SSID field 408, and may optionally comprise other fields 410, 412, 414 and 416 such as a vendor specific field 414. One of the differences between the frame body portion 200 of the beacon frame and the frame body portion 400 of a probe response frame is that the probe response frame may optionally include a requested information field 416 which (when included) must be the last optional field in the frame body portion 400. The requested information field 416 provides any information requested in the probe request frame that triggered transmission of the probe response frame.

The vendor specific field 414 of the probe response frame, like the vendor specific field 214 of the beacon frame, may be used to carry information not defined in the IEEE 802 standards and comprises an element ID sub-field 418, a length sub-field 420, an OUI sub-field 422 and a vendor-specific content sub-field 424.

Figure 5:
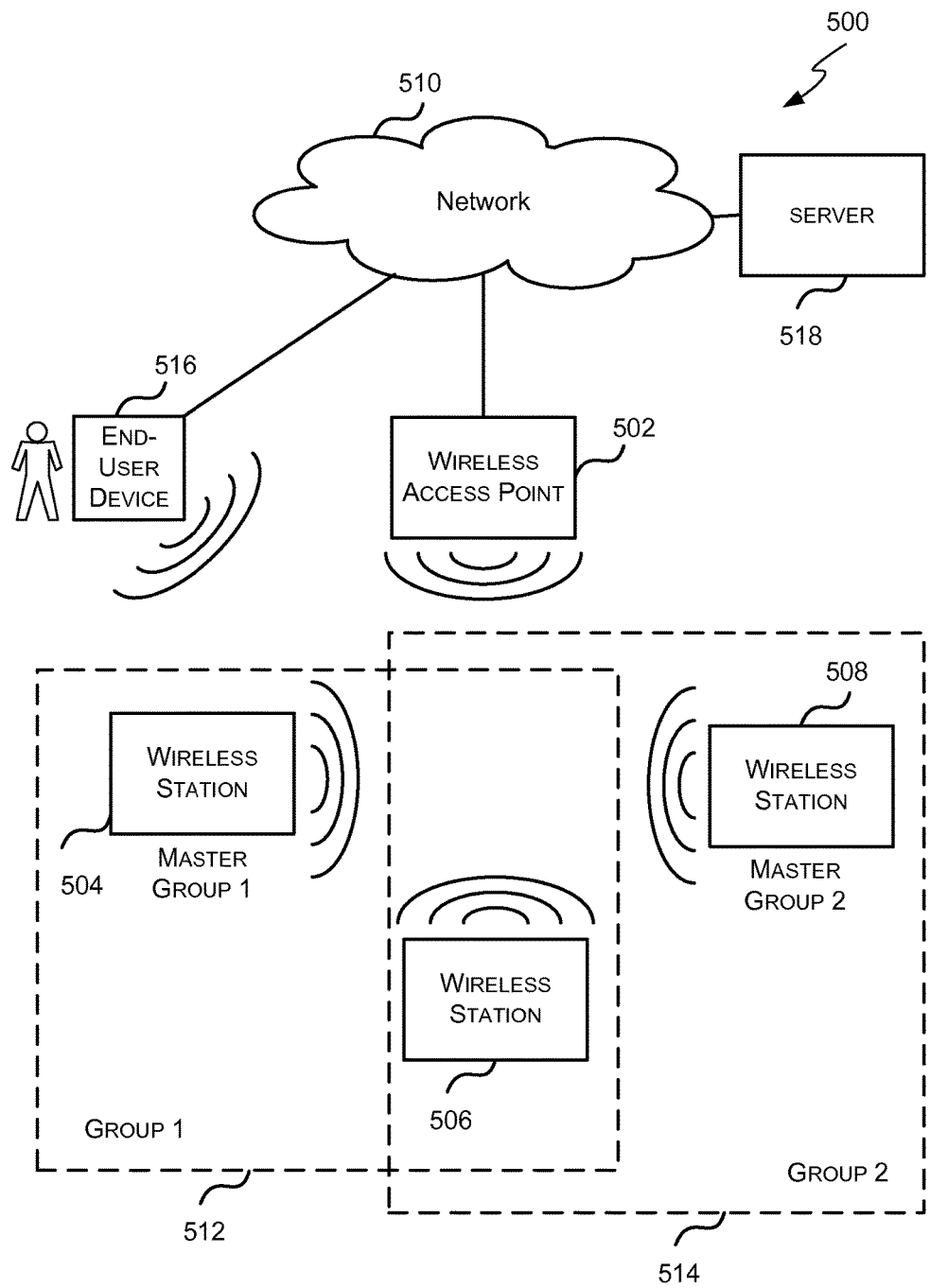
FIG. 5 is a block diagram of an example system for selecting a topology for a collection of wireless stations.

Reference is now made to FIG. 5 which illustrates an example system 500 wherein wireless stations exchange configuration information using the vendor-specific field 214, 310, 414 of a management frame (e.g. a Wi-Fi™ beacon frame, a Wi-Fi™ probe request frame, a Wi-Fi™ probe response frame). Since management frames can be transmitted and received without a wireless station being fully connected to the wireless network (e.g. without an IP address) wireless stations can exchange configuration information while operating in a low power mode (e.g. when the network stack is disabled). Therefore even while a wireless station is operating in a low-power mode the wireless station can maintain sufficient information about the other wireless stations in the wireless network to enable it to quickly and independently select the topology of a collection of wireless stations (e.g. select a master of a group of wireless stations).

The example system 500 comprises a wireless access point 502 and three wireless stations 504, 506 and 508. Although the example system 500 comprises three wireless stations 504, 505, 508 it will be evident to a person of skill in the art that methods and principles described herein may be used in any system with two or more wireless stations.

The wireless access point 502, allows wireless stations (e.g. wireless stations 504, 506, 508) within wireless range of the access point 502 to connect to a common wireless network and communicate with each other via the common wireless network. The wireless access point 502 may also be connected to another communication network 510, such as the Internet, which the wireless stations 504, 506, 508 may access via the wireless access point 502. In other examples, the wireless stations 504, 506, 508 may be able to communicate directly with each other and with a remote network, such as communications network 510, without a wireless access point 502. For example, Wi-Fi™ stations operating in ad-hoc or direct mode may be able to communicate directly with each other without an access point.

The wireless stations 504, 506 and 508 are computer-based devices that are able to wirelessly communicate with other devices using a wireless protocol, such as Wi-Fi™, Bluetooth™ and NFC. The wireless stations 504, 506 and 508 may be, but are not limited to, cameras, laptops, personal computers, tablet computers, mobile phones, radios, other audio devices, and other non-audio devices. An example wireless station will be described with reference to FIG. 10.

The wireless stations 504, 506 and 508 are configured to periodically generate and transmit management frames (e.g. Wi-Fi™ probe request frames, Wi-Fi™ probe response frames, Wi-Fi™ beacon frames) that comprise a vendor-specific field that includes configuration information about the transmitting wireless station. This type of management frame will be referred to herein as a configuration management frame. The configuration information provides the other wireless stations 504, 506 and 508 in the wireless network with information about the transmitting wireless station that allows them to select the most appropriate topology for a collection of the wireless stations 504, 506, and 508 for a particular application or task (e.g. to select a master wireless station from any collection of wireless stations in the system 500). An example method for generating and transmitting configuration management frames will be described with reference to FIG. 6.

The configuration information may include any data about the set-up and configuration of the transmitting wireless station 504, 506 or 508 that allows a wireless station to determine the topology of the wireless stations 504, 506 and 508 for a particular application or task. For example, the configuration information may provide information that allows the receiving wireless station 504, 506, 508 to assess the suitability of the transmitting wireless station to be a master wireless station of a group of wireless stations.

Examples of configuration information that may be included in the vendor-specific field include, but are not limited to, what version of software the wireless station is running (e.g. where the wireless station is a speaker running a particular software for its speaker functionality); whether the wireless station is using NTP (network time protocol) to synchronize its time and/or the address of the NTP server used; what version(s) of the 802.11 standards are supported by the wireless station; the strength of the signal received from the wireless access point 502; codec capabilities; a user's logged in status; type of wireless station (e.g. main hub or low power battery device); temperature of the wireless station; state of charge of a battery operated wireless stations; VoIP (voice over IP) capabilities; display capabilities; alarm capabilities (e.g. whether an alarm is set); recording and/or storage capability; level of time synchronization; processor capabilities and/or current average usage; firmware version; poll time; connection or usage identification; and UUID (universal unique identifier) or the like.

Using the vendor-specific field of a management frame (e.g. Wi-Fi™ probe request frame, Wi-Fi™ beacon frame, Wi-Fi™ probe response frame) to transmit configuration information allows the wireless stations 504, 506 and 508 to exchange configuration information without requiring the stations 502, 504 and 506 to be fully connected to the wireless network (e.g. the stations 504, 506 and 508 do not require the network stack to be enabled). This ensures that whenever a wireless station 504, 506 or 508 is called on to perform a specific task from a specific application the wireless station has the information it requires to determine the topology of the wireless stations for the specific application or task (e.g. to determine which of the wireless stations in a group of wireless stations is to be the master for the specific application or task). For example, it allows battery-operated wireless stations to conserve power by entering a low-power mode (e.g. by shutting down its network stack) but still be able to transmit and receive configuration information.

When a wireless station 504, 506, 508 receives a configuration management frame the wireless station stores the configuration information for later user (e.g. in determining the topology of a collection of wireless stations). In some cases the wireless station 504, 506, 508 may store the received configuration information in association with information identifying the wireless station to which the configuration information pertains (i.e. the wireless station that transmitted the configuration information). The information identifying the wireless station may be, for example, the MAC address, the IP address (if one has already been assign), the UUID (universal unique ID), or a user friendly name etc. of the wireless station. It will be evident to a person of skill in the art that other suitable information may be used to identify the wireless station. For example, the vendor-specific field may comprise information used to identify the transmitting wireless station.

In some cases the wireless access point 502, upon receiving a configuration management frame, may be configured to take the data in the vendor specific field and insert it in the vendor specific field of another management frame (e.g. a Wi-Fi™ beacon frame, a Wi-Fi™ probe response frame, a Wi-Fi™ probe request frame) and re-broadcast or transmit the new management frame. This allows wireless stations that are within the same wireless network, but not within wireless range of each other to exchange configuration information. For example, if the first and second wireless stations 504 and 506 of FIG. 5 are both in the same wireless network and thus are in wireless range of the access point 502, but are not within wireless range of each other they will not be able to exchange configuration information directly using configuration management frames even though they are part of the same wireless network. However, if the wireless access point 502 re-transmits or broadcasts the configuration information in configuration management frames received from the wireless stations 504 and 506 using another management frame the two wireless stations 504 and 506 can exchange configuration information.

As described above, in some cases specific applications or tasks may require a particular topology for the wireless stations (or part thereof). For example, multiple wireless stations may be grouped or otherwise logically linked to perform a particular task which may require a specific topology between the wireless stations within the group. In particular, some applications or tasks may require one of the wireless stations to act as a master. A master wireless station is a wireless station that is responsible for performing specific or special tasks.

For example, in an audio system comprising a group of wireless speakers, the master wireless speaker may be responsible for completing one or more of the following: maintaining a connection to a remote network (e.g. the Internet) to allow an audio stream to be obtained from the remote network; providing clocking information to which the other (e.g. slave) wireless speakers synchronize to; maintaining a RTSP (real time streaming protocol) connection with the other (e.g. slave) wireless speakers to provide the other (e.g. slave) wireless speakers the audio stream; and maintaining a connection with an end-user device (e.g. a specific application running on the end-user device) to allow the user to control the operation of the group of wireless speakers.

In FIG. 5, the first two wireless stations 504 and 506 are selected to form a first group 512 in relation to a first application or first task and the second and third wireless stations 506 and 508 are selected to form a second group 514 in relation to a second application or a second task. As shown in FIG. 5 each wireless station may be a member of only one group at a time or multiple groups at the same time. The groups may be manually formed (e.g. by a user) or may be automatically selected (e.g. by a server 518) based on certain criteria (e.g. location and function). For example, wireless audio speakers in the same room may be automatically grouped together. Alternatively, or in addition, a user may be presented with a list of all the wireless audio speakers in their network and they may manually group them.

When a wireless station comes online (i.e. it enables its network stack so that it is a fully connected to the wireless network) it may automatically assume it is part of the group that it was previously a member of. In these cases the wireless stations 504, 506, 508 may be configured to store an indication of which group they were previously a member and they may be also configured to insert this information into the configuration management frames they transmit so that the other wireless stations can be aware of the group membership. In other cases, or in addition, the wireless stations may be configured to receive information from another device (e.g. a server 518 or an end-user device 516) indicating which group or groups the wireless station is a member. For example, as described above, the system 500 may comprise a server 518 that is configured to automatically group devices and send a notification to the wireless stations 504, 506, 508 of their group members. In other examples, a user may manual group devices together which may cause a notification be send to the wireless stations indicating group membership.

Some applications or tasks may require a group of wireless stations have a particular topology. For example, in some cases an application or task may require one of the wireless stations in the group to act as a master wireless station with respect to the other wireless stations in the group. Once a wireless station becomes aware of the group to which it belongs and the other members of the group it uses predetermined criteria or a predetermined algorithm to determine the topology of the wireless stations in the group. For example, a wireless station may be configured to assess and/or compare its configuration information and the configuration information for the other members (received via management frames) to determine which of the member stations will be the master of the group. To be most effective all wireless stations use the same predetermined criteria or predetermined algorithm to select the topology. This ensures that all the wireless stations in the same group will independently select the same topology.

When the members of the group are called on by a particular application (e.g. to perform a particular tasks) they use the same topology. For example, in cases whether the wireless stations are configured to select a master wireless station, the master wireless station selected using the predetermined criteria or predetermined algorithm automatically takes on the role of the master and executes the tasks that are specific to the master and the other wireless stations assume they will not be the master.

Figure 6:
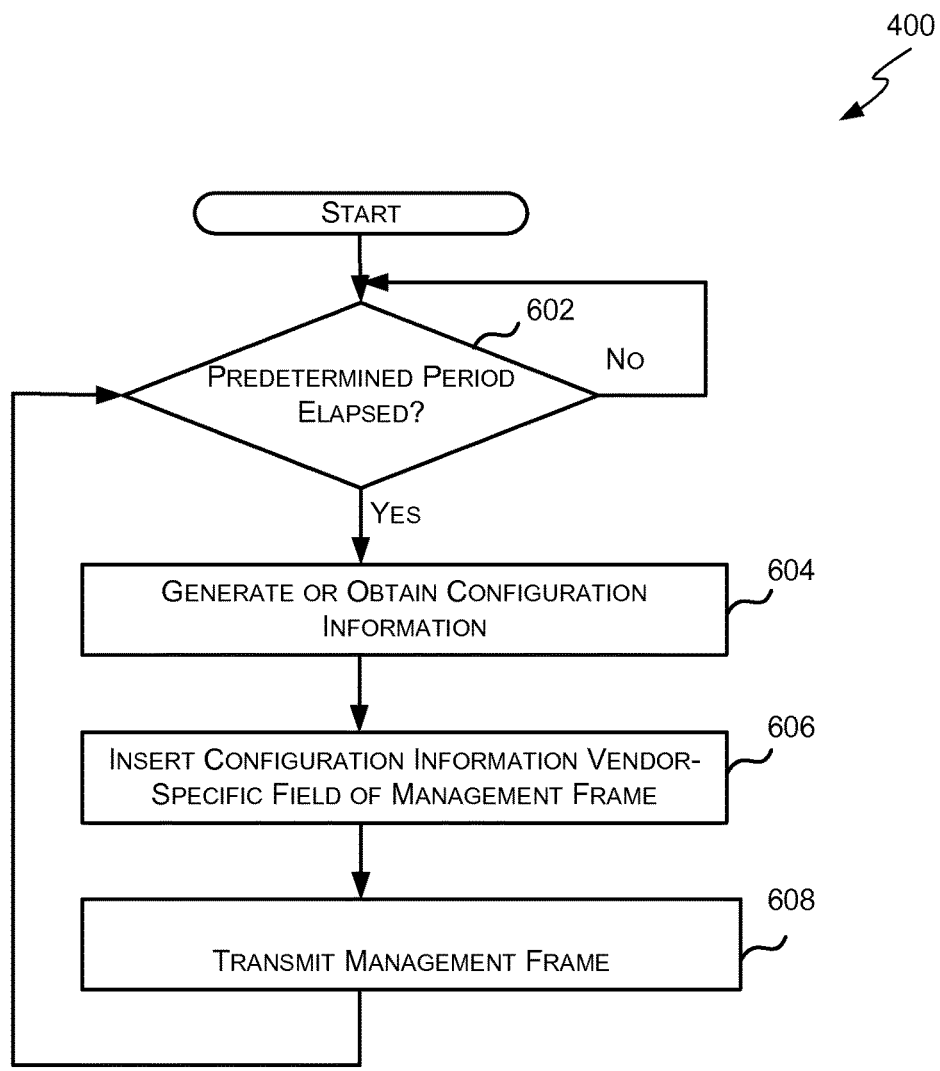
FIG. 6 is a flow diagram of an example method for generating and transmitting a configuration management frame.

Reference is now made to FIG. 6 which illustrates a flow chart of an exemplary method 600 for a wireless station to generate and transmit a configuration management frame. At block 602, the wireless station determines whether a predetermined period has elapsed since the last configuration management frame was sent. If the wireless station determines that the predetermined period has elapsed then the method 600 proceeds to block 604. Otherwise, the method proceeds back to block 602 where it waits until the predetermined period has elapsed. At block 604, the wireless station generates configuration information that conforms to a predetermined format (e.g. the format described with reference to FIG. 9). At block 606, the wireless station inserts the configuration information in the vendor-specific field of a management frame (e.g. Wi-Fi™ probe request frame, Wi-Fi™ beacon frame, Wi-Fi™ probe response frame) to form a configuration management frame. At block

608, the wireless station then wirelessly transmits the configuration management frame.

While in the example method 600 of FIG. 6 the wireless station is configured to transmit configuration management frames at a predetermined interval, in other cases other events may trigger a wireless station to generate and transmit a modified management frame. Generating and transmitting configuration management frames on a regular basis allows all wireless stations in the wireless network to keep up to date configuration information for the other wireless stations in the network.

Figure 7:
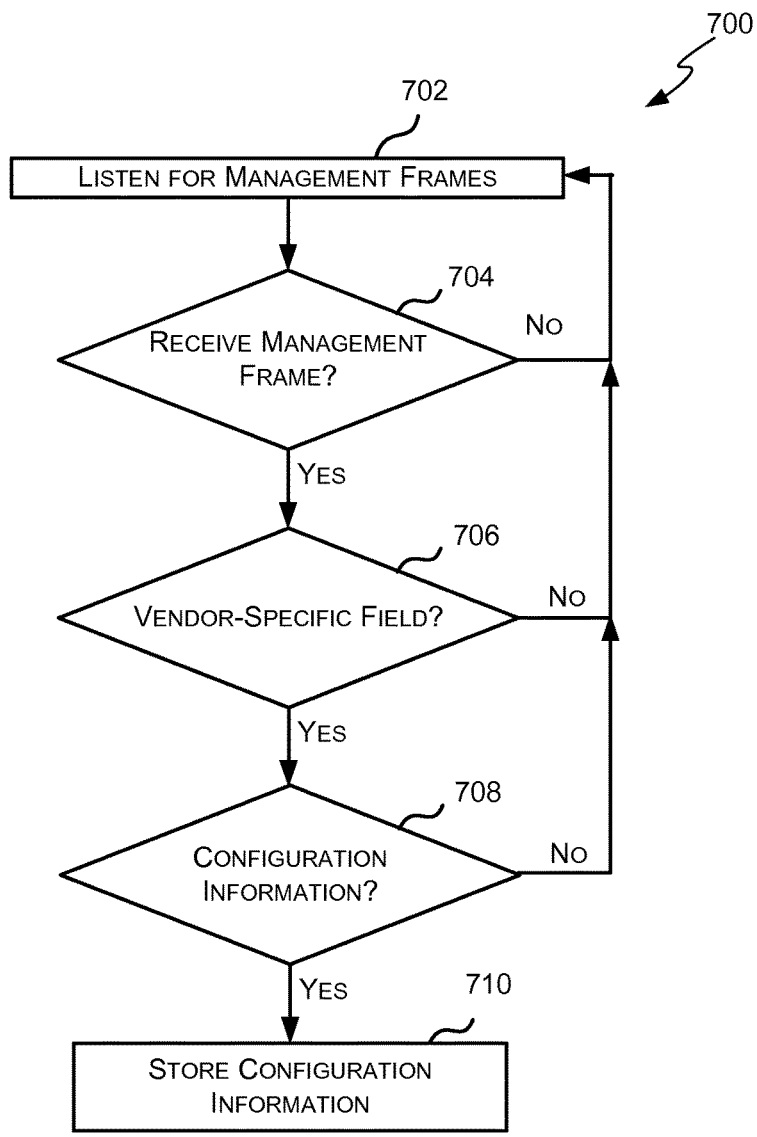
FIG. 7 is a flow diagram of an example method for receiving a configuration management frame.

Reference is now made to FIG. 7 which illustrates a method 700 for receiving a configuration management frame at a wireless station. At block 702, the wireless station listens for wireless management frames. As described above, the wireless station may be operating in a full power mode or a low-power mode (e.g. a mode where the network stack is disabled).

At block 704 the wireless station determines whether it has received a management frame. If the wireless station has not received a management frame then the method proceeds back to block 702. If, however, the wireless station has received a management frame then the method 700 proceeds to block 706.

At block 706, the wireless station determines whether the management frame has a vendor specific field. As described above the vendor specific field of a management frame may be identified by a specific element ID 216, 312, 418. Accordingly, determining whether the received management frame has a vendor specific field may comprise analyzing the element IDs of the optional fields in the frame body of the management frame. If it is determined that the management frame does not have a vendor specific field then the method 700 proceeds back to step 702. If, however, it is determined that the management frame has a vendor-specific field then the method 700 proceeds to block 708.

At block 708, the wireless station determines whether the vendor specific field comprises configuration information. As described above, when the vendor specific field comprises configuration information the vendor specific field may have a predefined format (e.g. the format shown in FIG. 9). Accordingly, determining whether the received management frame has a vendor specific field may comprise analyzing the format of the vendor-specific field. If it is determined that the vendor specific field does not comprise configuration information then the method 700 proceeds back to step 702 where the wireless station listens for the next management frame. If, however, it is determined that the vendor specific field comprises configuration information then the method 700 proceeds to block 710.

At block 710, the wireless station stores the received configuration information for later use in selecting the topology of the wireless stations (e.g. selecting a master wireless station in a group of wireless stations). In some cases the wireless station may store the received configuration information in association with information identifying the wireless station to which the configuration information pertains (i.e. the wireless station that transmitted the configuration information). In some cases the information identifying the wireless station may be one or more of: the MAC address of the wireless station, the IP address of the wireless station (if it has already been assigned), UUID (universal unique identifier), and a friendly name of the wireless station as shown to the user. In other cases, other suitable information may be used to identify the wireless station. For example, the vendor-specific field may comprise information that can be used to identify the wireless station.

Some management frames, such as Wi-Fi™ probe request frames, may be either directed or broadcast. A directed probe request frame comprises a specific SSID in the SSID field 302 and only wireless stations and access points with a matching SSID will accept and/or analyze a directed probe request frame. A broadcast probe request frame comprises a broadcast SSID (i.e. a null SSID) and all wireless stations and access points that receive the probe response frame will accept and/or analyze the probe response frame. Accordingly, in some cases prior to executing block 706, after receiving a management frame, the wireless station may be configured to assess the SSID field to determine if it comprises a broadcast SSID (i.e. a null SSID) or whether it comprises a specific SSID. If it comprises a specific SSID the receiving wireless station may determine whether it has the same SSID (i.e. belongs to the same wireless network). Only if the receiving wireless station has the SSID will it proceed to block 706. Otherwise it ignores the probe response frame and proceeds back to block 702.

Figure 8:
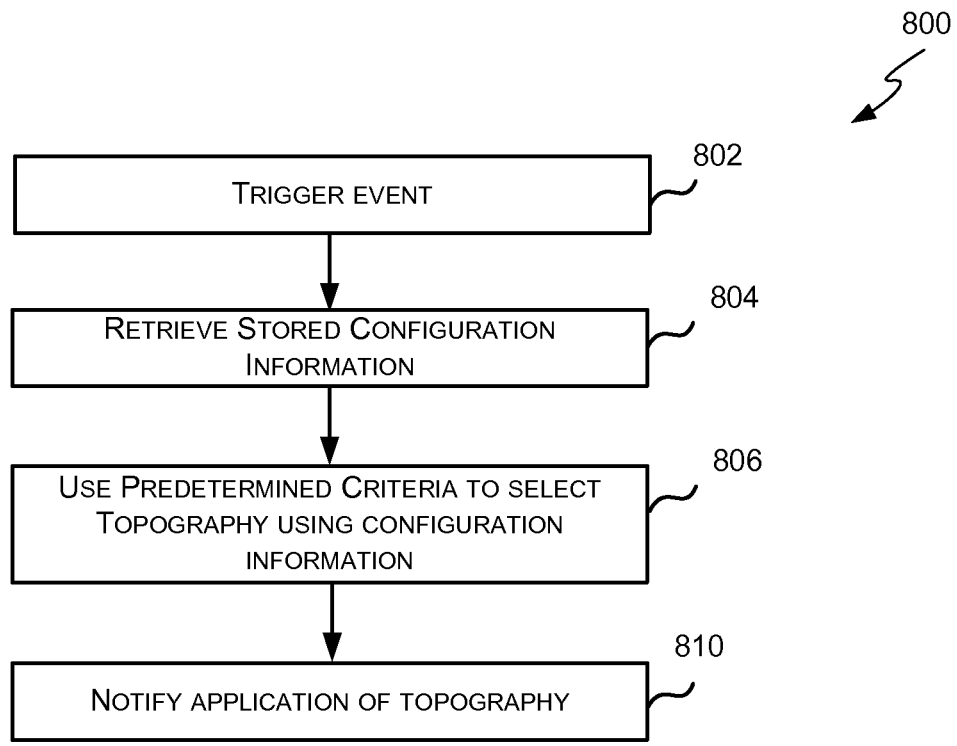
FIG. 8 is a flow diagram of an example method for selecting the topology of a collection of wireless stations.

Reference is now made to FIG. 8 which illustrates an example method 800 for selecting the topology of a collection of wireless stations using configuration information received from other wireless stations via configuration management frames. At block 802 a trigger event occurs. In some cases wireless stations may be configured to select the topology when they come online (e.g. their network stack is enabled). In these cases the trigger event is the coming online of the wireless station. In other cases, the wireless stations may be configured to select the topology when the wireless station receives a command from a particular application (e.g. to perform a particular task). In these cases the trigger event is receiving a command from a particular application. However, other suitable trigger events may also be used. Once the trigger event has occurred the method 800 proceeds to block 804.

At block 804, the wireless station retrieves the stored configuration information (i.e. the configuration information received from other wireless stations via configuration management frames). In particular, as described above when a wireless station receives a configuration management frame it stores the configuration information contained therein for later use.

In some cases, the wireless station only retrieves the stored information of the wireless stations that are members of the same group as the wireless station. In these cases the wireless station determines what group or groups it is a member of and the other wireless stations that are members of at the same group(s).

In some cases, the wireless station assumes it is in the same group or groups that it was previously. For example, the wireless station may store in, for example, memory a record of the group or groups that it was most recently a member of. When the wireless station boots it may read the memory record to determine what group or groups it is a member of. In other cases, or in addition, the wireless station may receive an indication from another device (e.g. an end-user device 516, or a server 518) that tells the wireless station what group or groups it is in. In either case a group may be identified by a unique identifier (e.g. a unique number). Where the wireless station is configured to store its group membership information and receive group membership information from another device, the group membership information received from another device may take priority or override the stored group membership information.

A wireless station may determine another wireless station is in the same group as itself based on group indication information received from another device (e.g. end-user device 516 or server 518). For example, the indication of group membership may comprise information identifying the other wireless stations that are members of the group. The members of the group may be identified using a unique identifier (e.g. MAC address, IP address, UUID).

In other cases, or in addition, the wireless station may determine another wireless station is in the same group based on the stored configuration information. For example, configuration management frames may comprise information identifying the group to which the wireless station is a member. This is then stored by the receiving wireless station as part of the configuration information.

Once the wireless station has retrieved the configuration information the method 800 proceeds to block 806.

At block 806, the wireless station applies predetermined criteria or a predetermined algorithm to its configuration information and the retrieved configuration information for the other wireless stations to determine a topology for the wireless stations.

In some cases, the wireless station uses the predetermined criteria or predetermine algorithm to determine which of the wireless stations in a group is most suitable for being the master. Each wireless station uses the same predetermined criteria or predetermined algorithm so they will independently select the same master. Where the wireless station is the only station in a group it may automatically select itself as the master. When a wireless station subsequently joins a group the master may stay the same or a new master may be selected using the predetermined criteria. For example, a new master may be selected if the new wireless station is, for example, closer to the access point and has a better signal strength or quality link with the access point that the current master.

Once the topology has been selected the method 800 may proceed to block 808. At block 808, the wireless station notifies the relevant application of the topology.

Figure 9:
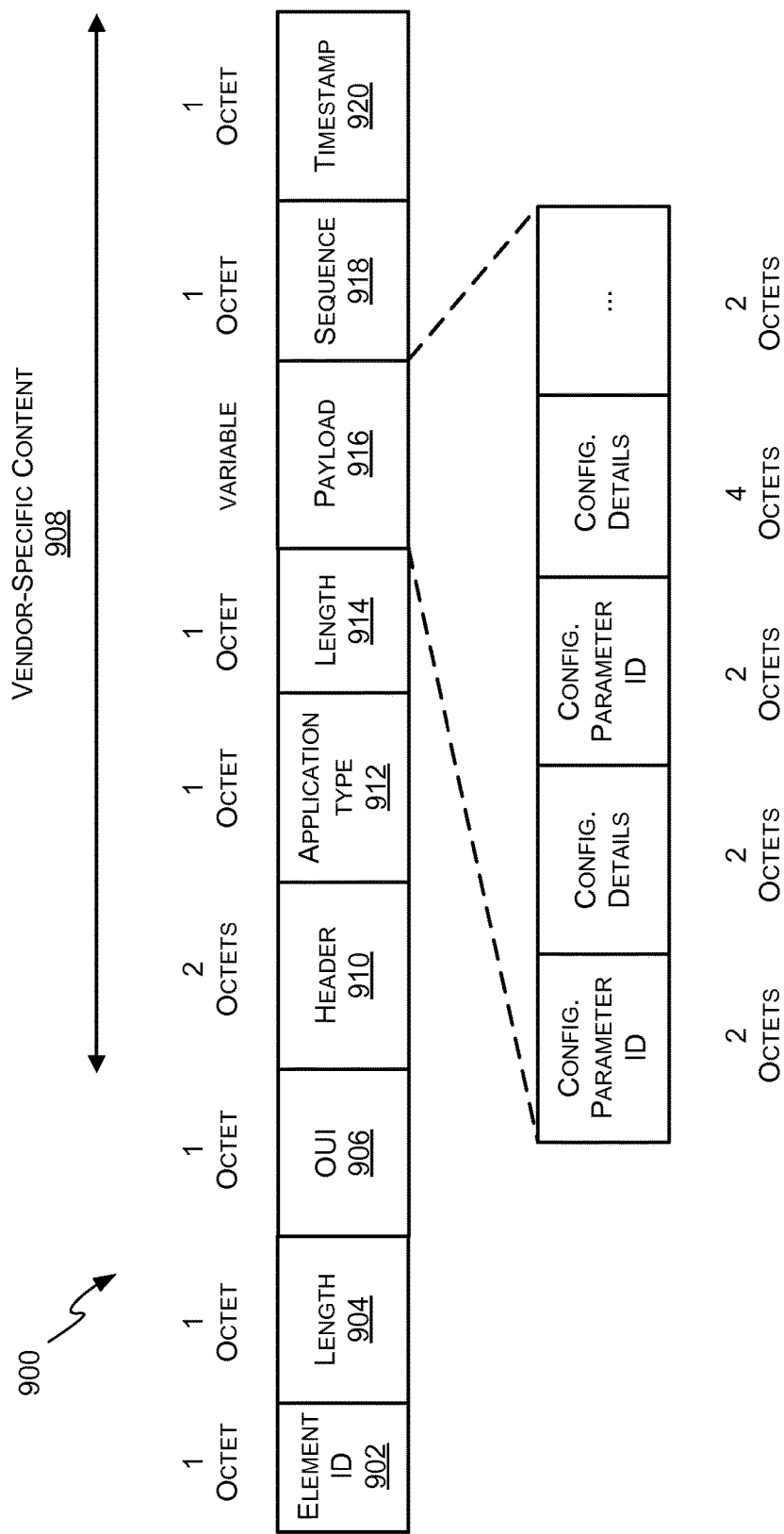
FIG. 9 is a schematic diagram of an example vendor-specific field of the frames of FIGS. 2-4.

Reference is now made to FIG. 9 which illustrates an exemplary format for the vendor-specific field 900 of a Wi-Fi™ management frame. As described with reference to FIGS. 2 to 5, the vendor-specific field 900 (e.g. 214, 310, 414) of a Wi-Fi™ management frame comprises a one octet element ID sub-field 902 (e.g. 216, 312, 418), a one octet length sub-field 904 (e.g. 218, 314, 420), a one octet OUI sub-field 906 (e.g. 220, 316, 422) and a variable length vendor-specific content sub-field 908 (e.g. 222, 318, 424).

The vendor specific content sub-field 908 of a configuration management frame may comprise a header portion 910, an application type portion 912, a length portion 914, a payload portion 916, a sequence portion 918, and a timestamp portion 920.

The header portion 910 may be used to identify the management frame as a configuration management frame (e.g. it may be used to indicate the vendor-specific field comprises configuration information). This allows wireless stations to easily and quickly identify configuration management frames. For example, the header portion 910 may include a particular code (e.g. 0x9000) to indicate that it is a configuration management frame.

The application type portion 912 may identify the device type that the packet is intended for. For example, the application type portion 912 may be used to identify that the frame is intended for a camera or a television.

The length portion 914 is used to specify the length of the payload portion 916 since the payload portion 916 may have a variable length.

The payload portion 916 is where the configuration information itself is inserted. In some cases the payload portion 916 may comprise pairs of configuration IDs and configuration information. The configuration ID identifies the particular type of configuration information to follow. In some cases, as shown in FIG. 9, the configuration ID may have a fixed length (e.g. 1 octet) and the configuration information have a variable length (e.g. 2 octets or 4 octets) based on the particular type of configuration information. Table 1 provides an example list of configuration IDs and their configuration information.

TABLE 1

| Configuration ID | Configuration Information |
|---|---|
| 0x0001 | NTP Information |
| 0x0002 | 802.11 Support |
| 0x0003 | Processor Speed |
| 0x0004 | Memory |

It will be evident to a person of skill in the art that the list provided in Table 1 is exemplary and that the methods and systems described herein may be implemented with more or fewer configuration IDs or with a different set of configuration IDs and/or configuration information.

The sequence portion 918 may be used to identify a sequence number. The sequence number may be used to enable a large packet to be split into several packets. For example, a sequence number of zero may denote that there are no further packets related to this packet and a sequence number of greater than zero may denote that there are more packets that relate to this packet. Accordingly, the wireless station generating the configuration management frame may generate the sequence number based on the size of the data to transmit.

The timestamp portion 920 may denote the time of the configuration management frame and/or the time when the next configuration management frame is due.

The methods and systems described in reference to FIGS. 5 to 9 may be used, for example, by wireless enabled speakers which are used to play synchronized music. In particular, the wireless enabled speakers can enter a low-power mode (e.g. their network stack is disabled) where they can still exchange configuration information using configuration management frames. This allows the speakers to quickly and easily select a master when they are asked to play a specific piece of music. The master then performs the master tasks such as obtaining the music and distributing it to the slave speakers.

Figure 10:
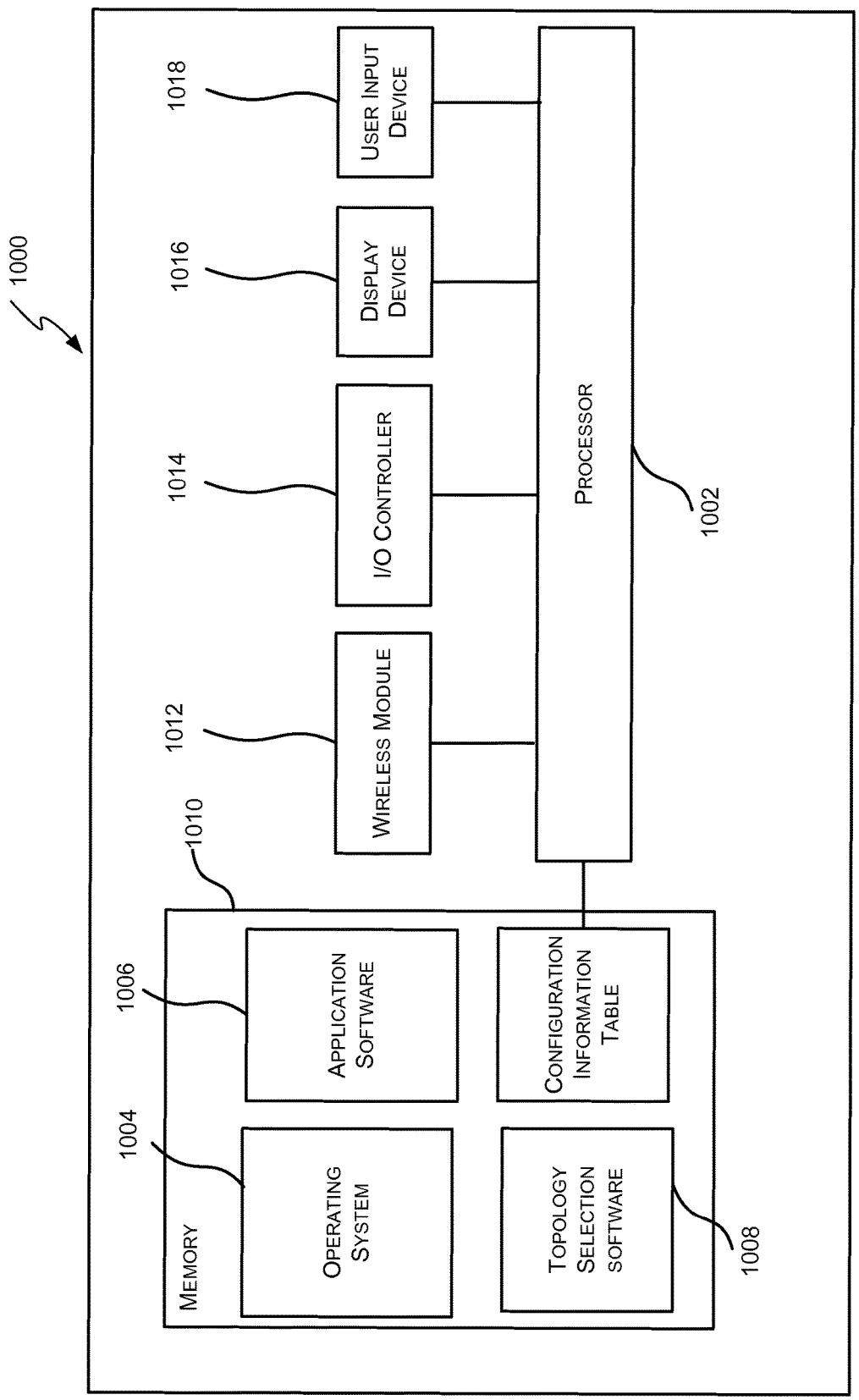
FIG. 10 is a block diagram of an example wireless station.

FIG. 10 illustrates various components of an exemplary wireless station 1000 which may be implemented as any form of a computing and/or electronic device, and in which embodiments of the systems and methods described above for selecting the topology of a group of wireless stations using configuration information obtained from configuration management frames.

Wireless station 1000 comprises one or more processors 1002 which may be microprocessors, controllers or any other suitable type of processors for processing computer executable instructions to control the operation of the device in order to transmit configuration management frames, receive configuration management frames; select the topology of a group of wireless stations. In some examples, for example where a system on a chip architecture is used, the processors 1002 may include one or more fixed function blocks (also referred to as accelerators) which implement a part of the methods in hardware (rather than software or firmware). Platform software comprising an operating system 1004 or any other suitable platform software may be provided at the wireless station 1000 to enable application software 1006, such as topology selection software 1008 to be executed on the device.

The computer executable instructions may be provided using any computer-readable media that is accessible by wireless station 1000. Computer-readable media may include, for example, computer storage media such as memory 1010 and communications media. Computer storage media (i.e. non-transitory machine readable media), such as memory 1010, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1010) is shown within the wireless station 1000 it will be appreciated that the storage may be distributed or located remotely and accessed via a network or other communication link (e.g. using wireless module 1012).

The wireless module 1012 allows the Wi-Fi station 1000 to communicate wirelessly with other devices using a wireless protocol, such as, but not limited to Wi-Fi™, Bluetooth™ and NFC.

The wireless station 1000 also comprises an input/output controller 1014 which may arranged to output display information to a display device 1016 (if present) which may be separate from or integral to the wireless station 1000. The display information may provide a graphical user interface. The input/output controller 1014 may also arranged to receive and process input from one or more devices, such as a user input device 1018 (e.g. a mouse or a keyboard). In an embodiment the display device 1016 may also act as the user input device 1018 if it is a touch sensitive display device. The input/output controller 1014 may also output data to devices other than the display device, e.g. a locally connected printing device (not shown in FIG. 10).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of selecting a topology for a collection of wireless stations, the method comprising:
   wirelessly receiving at a first wireless station one or more configuration management frames, each configuration management frame being a management frame comprising configuration information for another wireless station in a vendor-specific field; and
   applying predetermined criteria to the received configuration information at the first wireless station to determine a topology for a collection of wireless stations, the collection of wireless stations comprising at least the first wireless station and said another wireless station.

2. A non-transitory computer readable storage medium having stored thereon computer executable program code that when executed causes at least one processor to execute the method of claim 1.

3. A system to select a topology for a collection of wireless stations, the system comprising:
   a first wireless station comprising:
      a wireless module configured to wirelessly receive one or more configuration management frames, each configuration management frame being a management frame comprising configuration information for another wireless station in a vendor-specific field; and
      a processor in communication with the wireless module, the processor configured to apply predetermined criteria to the received configuration information to determine a topology for a collection of wireless stations, the collection of wireless stations comprising at least the first wireless station and said another wireless station.

4. The system of claim 3, wherein at least one of the configuration management frames is received directly from another wireless station of said collection of wireless stations.

5. The system of claim 3, wherein at least one of the configuration management frames is received directly from a wireless access point.

6. The system of claim 3, wherein the wireless module is configured to receive the one or more configuration management frames while the first wireless station is operating in a mode where the first wireless station is not fully connected to a wireless network shared by the wireless station and said another wireless station.

7. The system of claim 6, wherein the processor is configured to determine the topology for the collection of wireless stations while the first wireless station is operating in a mode where the first wireless station is fully connected to the wireless network.

8. The system of claim 3, wherein determining the topology enables the first wireless station to execute one of an application and a task without having to first request the configuration information from said another wireless station.

9. The system of claim 3, wherein the wireless module is further configured to receive the one or more configuration management frames while the first wireless station is operating in a low-power mode.

10. The system of claim 9, wherein when the first wireless station is operating in the low power mode a network stack of the wireless station is disabled.

11. The system of claim 3, wherein said another wireless station comprises:
    a processor configured to:
       generate configuration information;
       insert the configuration information in a vendor-specific field of a management frame to generate a configuration management frame; and
    a wireless module in communication with the processor, the wireless module configured to wirelessly transmit the configuration management frame.

12. The system of claim 11, wherein the processor of said another wireless station is configured to insert the configuration information into the vendor-specific field of one of a probe request frame, a beacon frame, and a probe response frame.

13. The system of claim 11, further comprising a wireless access point configured to:
    receive the configuration management frame transmitted by the other wireless station;
    insert the configuration information into a vendor-specific field of a management frame to generate another configuration management frame; and
    wirelessly transmit the other configuration management frame.

14. The system of claim 13, wherein the wireless access point is configured to insert the configuration information in a vendor-specific field of one of a probe request frame, a beacon frame, and a probe response frame.

15. The system of claim 3, wherein determining the topology for the collection of wireless stations comprises selecting a master wireless station from a group of wireless stations, the group of wireless stations comprising at least the first wireless station and said another wireless station.

16. The system of claim 15, wherein the processor of the first wireless station is further configured to:
    receive an instruction to perform a specific task as part of the group;
    determine if the wireless station is the selected master of the group;
    in response to determining the first wireless station is the selected master of the group, perform the task as the master.

17. A method of wirelessly exchanging configuration information, the method comprising:
    wirelessly receiving at a wireless station one or more configuration management frames for one or more other wireless stations, each configuration management frame being a management frame comprising configuration information for one of the one or more other wireless stations in a vendor-specific field; and
    applying predetermined criteria to the received configuration information at the wireless station to configure the wireless station for one of an application and a task, the configuration enabling the wireless station to execute the application or task without having to first request the configuration information from the one or more other wireless stations.

18. A wireless station comprising:

a wireless module configured to wirelessly receive one or more configuration management frames for one or more other wireless stations, each configuration management frame being a management frame comprising configuration information for one of the one or more other wireless stations in a vendor-specific field; and a processor in communication with the wireless module, the processor configured to apply predetermined criteria to the received configuration information to configure the wireless station for one of an application and a task, the configuration enabling the wireless station to execute the application or task without having to first request the configuration information from the one or more other wireless stations.

19. The wireless station of claim 18, wherein at least one of the configuration management frames is received directly from one of the one or more other wireless stations.

20. The wireless station of claim 18, wherein the wireless module is configured to receive the one or more configuration management frames while the wireless station is operating in a mode where the wireless station is not fully connected to a wireless network shared by the wireless station and the one or more other wireless stations.

* * * * *